United States Patent [19]

Kiuchi et al.

[11] 4,303,326

[45] Dec. 1, 1981

[54] ELECTROMAGNETICALLY DRIVEN SHUTTER DEVICE FOR CAMERA

[75] Inventors: Masayoshi Kiuchi, Yokohama; Syuichiro Saito, Kawasaki, both of Japan

[73] Assignee: Canon Kabushiki Kaisha, Tokyo, Japan

[21] Appl. No.: 161,390

[22] Filed: Jun. 20, 1980

[30] Foreign Application Priority Data

Jun. 20, 1979 [JP] Japan ................................. 54/77800

[51] Int. Cl.³ .......................... G03B 7/08; G03B 9/08; G03B 9/40
[52] U.S. Cl. .................................... 354/234; 354/51; 354/246
[58] Field of Search ................. 354/234, 235, 246, 50, 354/51, 60

[56] References Cited

U.S. PATENT DOCUMENTS

| | | | |
|---|---|---|---|
| 3,257,919 | 6/1966 | Sato et al. | 354/60 X |
| 3,950,772 | 4/1976 | Nakagawa et al. | 354/234 |
| 3,953,867 | 4/1976 | Kondo | 354/235 X |
| 4,012,751 | 3/1977 | Espig | 354/235 X |
| 4,072,965 | 2/1978 | Kondo | 354/234 X |
| 4,129,370 | 12/1978 | Ishiguro et al. | 354/234 |

FOREIGN PATENT DOCUMENTS 2640412  3/1978  Fed. Rep. of Germany ...... 354/235

Primary Examiner—Donald A. Griffin
Attorney, Agent, or Firm—Toren, McGeady & Stanger

[57] ABSTRACT

An electromagnetically driven shutter for camera for driving the shutter blades by means of an electromagnetic driving source being characterized in that the current supply circuit to the electromagnetic driving source from the camera power source is provided with a condenser which is normally charged with the output of the camera power source or its step up circuit in such a manner that by means of the driving pulse produced with the shutter release the charge of the condenser is superposed over the power source voltage and delivered to the electromagnetic driving source so as to increase the starting speed of the shutter blades.

8 Claims, 9 Drawing Figures

FIG.3
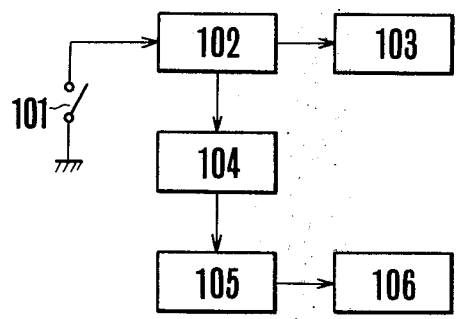
FIG.4
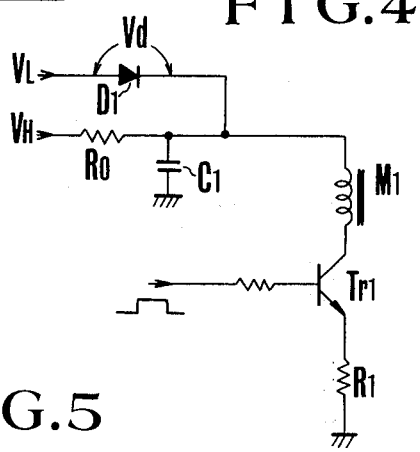
FIG.5
(a) DRIVING PULSE 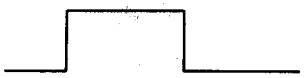
(b) CURRENT RUNNING THROUGH $M_1$ 
$$i_1 = \frac{V_H - V_{CE}}{R_1 + r}$$
$$i_2 = \frac{V_L - (L_d + V_{CE})}{R_1 + r}$$

$$i_3 = \frac{2V - (V_{CES2} + V_{CES4})}{r}$$

$$i_4 = \frac{V - (V_d + V_{CES4})}{r}$$

$$i_5 = \frac{V_{Z1} + V_{Z2} - V_{BE}}{R_2}$$

$$i_6 = \frac{V_{Z1} - V_{BE}}{R_2}$$

ELECTROMAGNETICALLY DRIVEN SHUTTER DEVICE FOR CAMERA

BACKGROUND OF THE INVENTION

The present invention relates to an improvement of the driving circuit of the slit exposure shutter in accordance to which by means of the electromagnetic driving source the front and the rear shutter blades are driven so as to carry out the exposure running and the reset running.

The electromagnetically driven slit shutter by means of which the shutter blades runs with the current supplied from the electromagnetic driving source so as to carry out the exposure operation or the reset operation is quite suited to the electronic camera, because the driving mechanism can be remarkably simplified as compared with the conventional mechanical shutter, so that various systems have been proposed.

However, the power source built in this kind of the camera is limited to the low voltage battery with small capacity, so that the rising up of the shutter blade driving cannot be carried out smoothly, which is inconvenient. Further, a high shutter speed is hard to obtain, which is also inconvenient.

Until now, in order to overcome such shortcomings, it has been tried to make the shutter blades or the driving power transmission mechanism light.

SUMMARY OF THE INVENTION

An object of the present invention is to offer an electromagnetically driven shutter for camera with high rising up shutter speed in order to overcome the above mentioned shortcomings.

Another object of the present invention is to offer an efficient electromagnetically driven shutter device with small capacity power source for camera by simply providing with a circuit means simple in comparison with the conventional electromagnetically driven shutter device.

In accordance with an embodiment of the present invention, the rising up wave form of the driving current for operating the shutter device by making use of an electromagnetic force so as to increase the initial speed of the shutter blades.

In accordance with another embodiment of the present invention the charge voltage of the condenser is superposed over the power source voltage at the time of the shutter release by providing a condenser to be charged while no photograph is taken so that by means of a very simple circuit means a small battery built-in the camera can be used effectively.

BRIEF DESCRIPTION OF THE DRAWINGS

FIG. 3 shows a block diagram of an example of the driving circuit for the normal electromagnetically driven shutter.

FIG. 4 shows the circuit diagram of an embodiment of the shutter driving circuit of the present invention.

FIG. 5 shows the wave forms for explaining the operation of the circuit shown in FIG. 4.

DESCRIPTION OF THE PREFERRED EMBODIMENTS

Below the present invention will be explained in detail in accordance with the drawings of the embodiment. Firstly an example of the electromagnetically driven shutter suited for the shutter driving circuit of the present invention.

Figure 1:
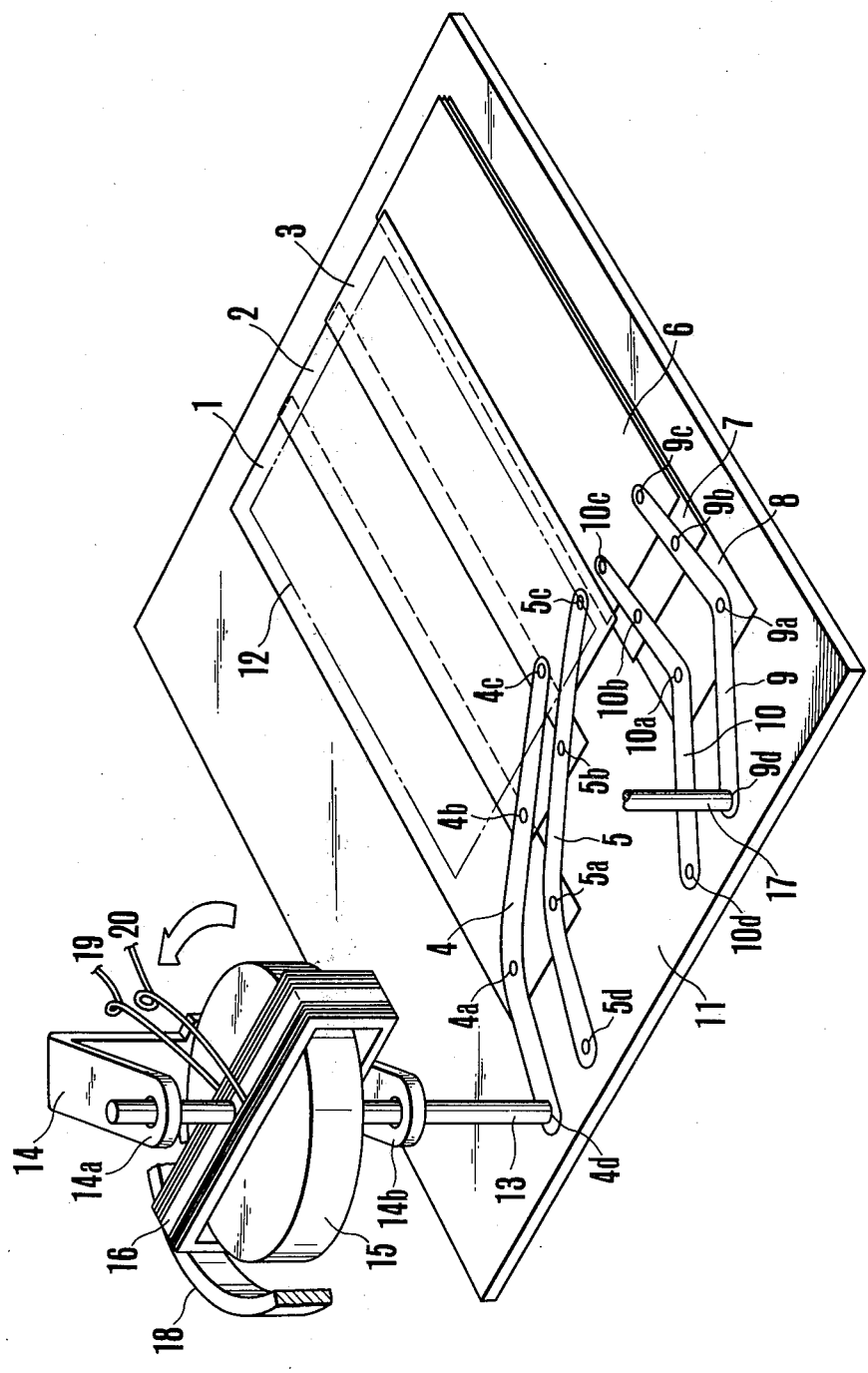
FIG. 1 shows an embodiment of a shutter having a meter type electromagnetic driving source to be used for the driving circuit of the present invention in perspective view.
Figure 2:
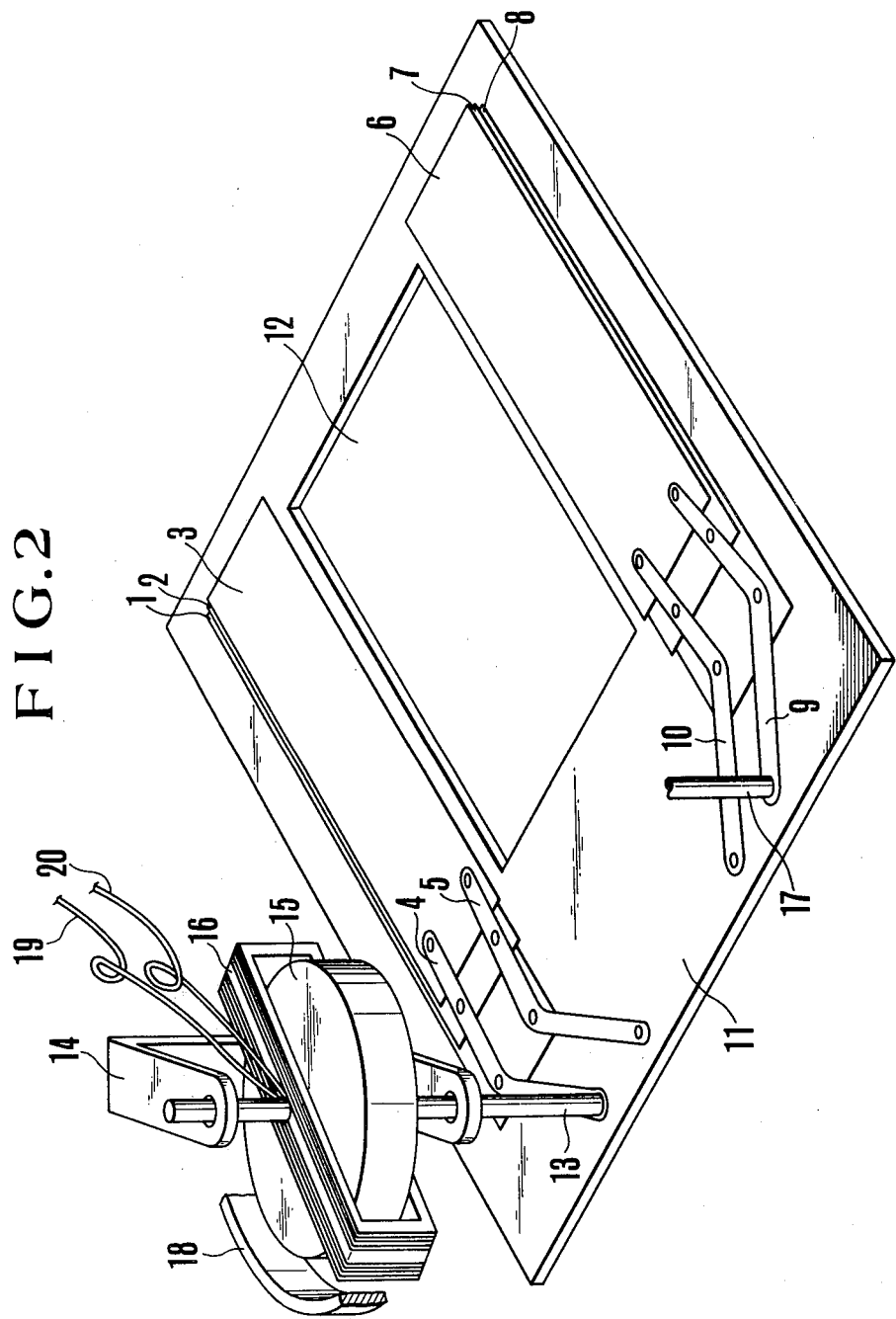
FIG. 2 shows the front shutter blade shown in FIG. 1 which has run in perspective view.

FIGS. 1 and 2 show an embodiment of the electromagnetically driven shutter device having a meter type electromagnetic driving part in perspective view. For the sake of simplification, only the front blade driving part is shown, while the rear blade driving part is eliminated.

FIG. 1 shows the state in which the front blades 1, 2 and 3 have not yet been driven, while FIG. 2 shows the state in which the front blades 1, 2 and 3 have been driven so as to open the exposure window totally.

In FIGS. 1 and 2, 11 is the shutter base plate consisting of a light metal. 12 is an opening as exposure window provided on a part of the base plate.

1, 2 and 3 are the three front blades consisting of light shading thin plates for constituting the front curtain. The front blades 1, 2 and 3 are rotatably arranged at 4a, 4b, 4c, and 5a, 5b and 5c respectively with reference to the front blade driving arms 4 and 5. The front blade driving arms 4 and 5 consists for example of a light metal. The arm 5 is rotatably mounted on the shutter base plate 11 by means of the one end 5d. The arm 4 is secured on the front shutter blade driving shaft 13 with the one end 4d, while the shaft 13 is rotatably mounted on the shutter base plate.

9 and 10 are the rear shutter blade driving arm, whereby the arm 9 is secured on the rear shutter blade driving shaft 17 with the one end, while the shaft 17 is rotatably mounted on the shutter base plate. The arm 10 is rotatably mounted on the shutter base plate with the one end 10d. 6, 7 and 8 are the rear shutter blades consisting of light shading thin plates. The rear shutter blades 8, 7 and 6 are rotatably mounted on the rear shutter blade driving arms 9 and 10 at 9a, 9b, 9c and 10a, 10b and 10c. 14 is the frame of a meter type driving part on which a permanent magnet 15 magnetized along the direction of diameter is secured and which is secured on the shutter base plate or a member secured in the camera not shown in the drawing. 16 is the front shutter blade driving coil secured on the front shutter blade driving shaft 13. The shaft 13 itself is rotatably supported in the support holes 14a and 14b formed in the frame. 18 is the yoke provided at a certain distance from the permanent magnet 15 in such a manner that the driving coil 16 is rotatable with reference to the permanent magnet 15, whereby the yoke 18 is secured on a member fixed in the camera body or the frame 14 so as to form a magnetic circuit.

When a current is supplied to the driving coil 16 through the conductors 19 and 20, the part of the coil wiring existing in the magnetic field produces a strength. This strength is produced at the right angle to the direction of the magnetic flux and the current in accordance with the Fleming's law so as to work upon the driving shaft 13 as moment of couple and rotate the front blade driving coil along the counterclockwise direction, whereby in operative engagement with this rotation the front blade driving shaft 13 is rotated along the counterclockwise direction so as to rotate the front blade driving arms 4 and 5 along the counterclockwise direction. Further, by means of a link mechanism, the front shutter blades 1, 2 and 3 move upwards to the left in the drawing so as to start the exposure. When a current is delivered to the rear shutter blade driving coil from the driving circuit after the lapse of a certain time determined by means of the control circuit after a current has been supplied to the front shutter blade driving coil, the rear shutter blade driving part operates in the same way as the front shutter blade driving part so as to drive the rear shutter blades 6, 7 and 8 upwards to the left in the drawing. After the rear shutter blades have run and the exposure has been terminated a current is supplied to the front shutter blade driving coil and the rear shutter blade driving coil from the driving circuit along the reversed direction to that at the time of exposure in such a manner that the front shutter blade driving part and the rear shutter blade driving part carry out the reversed operation to that at the time of the exposure, so that the front shutter blades and the rear shutter blades are charged into the state before the exposure. In the drawing, as the current supply means to the driving coil a lead-in wire is used, whereby a current can be supplied not only through the brush but also through the coil spring as in case of the meter of the measuring instrument.

Below the driving circuit for the electromagnetically driven shutter of the present invention will be explained. FIG. 3 shows a block diagram of the driving circuit of the electromagnetically driven shutter. In the drawing, 101 is the release switch operatively engaged with the shutter release so as to be closed with the release operation. 102 is a conventional one shot circuit for producing a front shutter blade driving pulse signal with the closing of the switch 101. 103 is the front shutter blade driving circuit for producing the driving signal for rotating the front shutter driving source with the signal from 102. 104 is the conventional delay circuit for obtaining a delay time in accordance with the photographing information. 105 is the conventional one shot circuit to be triggered with the delay signal from 104 so as to produce the rear shutter blade driving pulse, by means of which pulse the rear shutter blade driving circuit 106 is controlled so as to produce the rear shutter blade driving signal and allow the rear shutter blade to start to run. Hereby, the one shot circuits 102 and 105 and the driving circuits 103 and 106 can be constituted in the same way to each other.

FIG. 4 shows the circuit of an embodiment of the front shutter blade driving circuit 103 or the rear shutter blade driving circuit 106 of the present invention.

In the drawing, M1 is the coil corresponding to the moving coil 16 shown in FIGS. 1 and 2. Tr1 is the npn transistor as the first switching means, whose emitter and collector are connected in series between the above coil M1 and the resistance R1.

The other end of the resistance R1 is grounded, while the other end of the coil M1 is connected to the cathode of the non-return diode D1. To the anode of the diode D1 the power source voltage VL is applied. Further, to the cathode of the diode D1 the one end of the condenser C1 and that of the resistance R0 are connected, whereby the other end of the condenser C1 is grounded, while to the other end of the resistance R0 a voltage VH higher than that VL is applied. Hereby, the voltage VH is an output of a voltage source of a corresponding circuit means, whereby the voltage VL may be step up into VH. The current capacity of the voltage source obtained in this way may be small, which is one of the features of the present invention.

Hereby, the base of the transistor Tr1 is connected to the output of the above mentioned one shot circuit 102 through a resistance. The condenser C1 has been charged up to VH in advance.

When then the shutter release signal is delivered from the one shot circuit for example, by closing the release switch 101, the transistor Tr1 is brought into the switched on state in such a manner that to the coil M1 the higher voltage VH is applied, because the voltage source outputs VL and VH are connected in parallel.

At this time, by means of the non-return diode D1 the charge in the condenser C1 does not flow to the power source at the side of the voltage VL. Further, by means of the resistance R0 the current from the voltage source delivering VH hardly flows to the coil M1. Instead of it, the charge of the condenser C1 flows. Consequently, through the coil M1 a large current flows instantaneously, while no particular load is laid upon the voltage source at the side of the voltage VH. Thus, it is sufficient to prepare a voltage source output with small current capacity, whereby for example the voltage VL is step up by means of a simple method. Namely, by means of a simple circuit means, the power source can be made use of effectively.

Further, as is shown in the wave form diagram shown in FIG. 5, at the beginning of the driving pulse (a) the voltage of the condenser C1 is applied to the coil M1 and discharge, as is shown in the curve (b), down to the voltage equal to VL. At this time, the power source voltage V1 is applied to the coil M1 through the diode D1 so that the driving current running through the coil assumes a certain determined value in such a manner that the electromagnetic driving source is driven by means of the wave form shown in FIG. 5(b), whereby the shutter blades start to run at high speed. Namely, the initial current running through the coil M1 is represented.

$$I1 = \frac{VH - VCE}{R1 + r}$$

while the stabilized current is represented $$I2 = \frac{VL - (Vd - VCE)}{R1 + r}$$

whereby
r: Internal resistance of the driving coil
VCE: Voltage between the collector and the emitter of the transistor Tr1
R1: Series resistance
Vd: Voltage along the forward direction of the diode
Namely, I1>I2 so that by means of a simple method, the shutter blades start to run at high speed.

Figure 6:
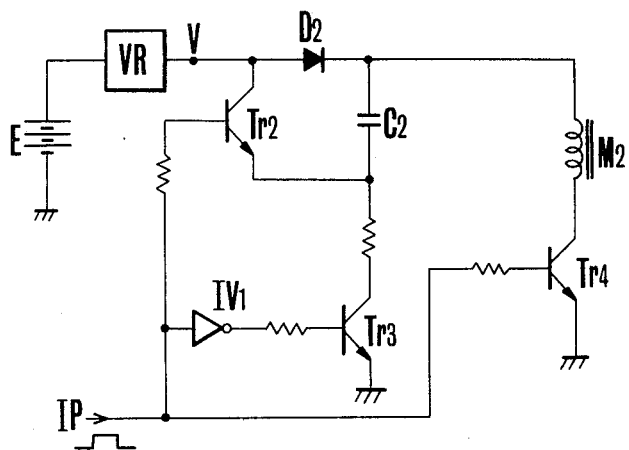
FIG. 6 shows the circuit diagram of another embodiment of the driving circuit of the present invention.

FIG. 6 shows the circuit diagram of another embodiment of the driving circuit of the present invention, so designed that at the start of the shutter driving a voltage twice as high as the power source voltage can be delivered.

In the drawing, E is the power source, and VR is the conventional voltage regulator as the means for stabilizing the output of the power source voltage. Now, let us suppose that the output of the regulator VR be V. D2 is the non-return diode, whose anode is connected to the output of the regulator VR. M2 is the movable coil corresponding to the movable coil 16 in FIGS. 1 and 2 in the same way as in case of M1 in FIG. 4. Tr2, Tr3 and Tr4 are the npn transistors, whereby the one end of the coil M2 is connected to the collector of the transistor Tr4, while the emitter of the transistor Tr4 is grounded. Further, the base is connected to the output of the one shot circuit 102 in FIG. 3 through the resistance. The collector of the transistor Tr2 is connected to the output of the regulator VR and the emitter to the anode of the diode D2 through the condenser C2. Further, the base is connected to the output of the above mentioned one shot circuit 102 through a resistance. The collector of the transistor Tr3 is connected to the emitter of the transistor Tr2 through a resistance, while the emitter of the transistor Tr3 is grounded. Further to the base the output of the one shot circuit 102 is connected through the inverter IVI and a resistance.

Below the operation of the above circuit will be explained.

Figure 7:
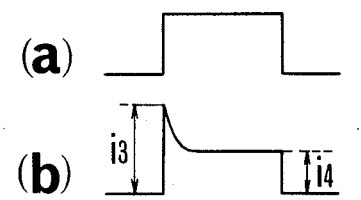
FIG. 7 shows the wave forms for explaining the operation of the circuit shown in FIG. 6.

In the state in which no shutter release signal exists, the transistors Tr2 and Tr4 are in the switched off state, while Tr3 is in the switched in state. Thus, the condenser C2 is charged up to the voltage V stabilized with the voltage regulator VR. When then the one shot circuit 102 delivers a shutter release signal, the transistors Tr2 and Tr4 are brought into the switched-on state, while the transistor Tr3 to whose base the inverter IV1 is connected is brought in the switched-off state. Thus, the condenser C2 assumes the state in which the condenser C2 is connected in parallel with the diode D2, in such a manner that the voltage V is in series with the voltage V of the condenser C2 through the transistor Tr2 so that to the coil M2 the voltage 2V is applied. In this way, the rising up of the starting speed of the shutter is improved. Further, the condenser C2 is discharged, the voltage V is applied to the coil M2 through the diode D2 in such a manner that a constant driving current flows. FIG. 7 shows the wave forms at various parts of the circuit shown in FIG. 6, whereby FIG. 7(a) shows the output wave form of the one shot circuit 102, while FIG. 7(b) shows the output wave form running through the coil M2. i3 is the rising up current value, while i4 is the stabilized current value during the driving.

VCES2–VCES4 are respectively the voltages between the collectors and the emitters of the transistors Tr2–Tr4. r is the internal resistance of the transistor coil M2. Vd is the voltage between the both terminals of the diode D2 when a forward current flows through the diode D2.

Figure 8:
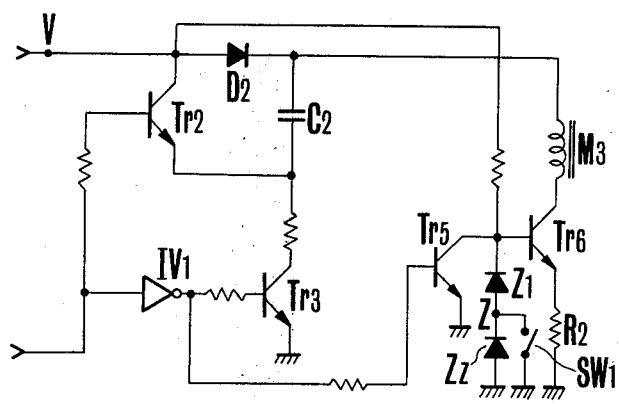
FIG. 8 shows the circuit diagram of the third embodiment of the present invention.

FIG. 8 shows the circuit diagram of another embodiment of the present invention, whereby the circuit shown in FIG. 6 is completed with a constant current driving circuit.

The connection of the transistors Tr2 and Tr3, the condenser C2, the diode D2 and the inverter IV1 is same as that shown in FIG. 6. Tr5 and Tr6 are the npn transistors, whereby the base of the transistor Tr5 is connected to the output of the inverter IV1 through a resistance. Further, the emitter of the transistor Tr5 is grounded, while the collector is connected to the base of the transistor Tr6 and to the anode of the diode D2 through a resistance. Further, the collector of the transistor Tr6 is connected to the cathode of the diode D2 through the coil M3. In the same way, as in case of the coils M1 and M2, the coil M3 corresponds to the moving coil 16 shown in FIGS. 1 and 2. The emitter of the transistor Tr6 is grounded through the resistance R2. To the base the cathode of the constant voltage diode Z1 is connected, whereby the anode of the diode Z1 is connected to the cathode of the constant voltage diode Z2 and grounded through the switch SW1. The anode of the constant voltage diode Z2 is grounded. Further, the switch SW1 is opened for a certain determined time after a shutter release signal is delivered from the one shot circuit. As the method to set this determined time either a timer circuit or a mechanical switch in operative engagement with the displacement of the shutter blades may be used.

Below, the operation of the above circuit will be explained.

The transistor Tr5 is in the switched on state until the shutter release signal is obtained. Thus, the transistor Tr6 is in the switched-off state, whereby a current is supplied to the coil M3.

When the shutter release signal is delivered, the voltage 2 V is applied to the coil M3 for a moment as explained above. On the other hand, at this time the transistor Tr5 as well as the switch SW1 are in the switched-off state so that the sum of the voltages VZ1 and VZ2 between the both terminals of the constant voltage diodes Z1 and Z2 is delivered to the base of the transistor Tr6.

Figure 9:
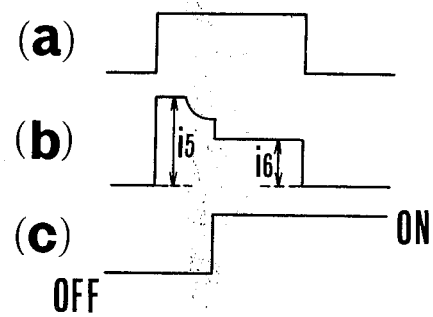
FIG. 9 shows the wave forms for explaining the operation of the circuit shown in FIG. 8.

Consequently, the current running through the coil M3 by means of the voltage VZ1+VZ2 is controlled on the level of i5 shown in FIG. 9(b). Then, along with the discharge of the condenser C2 the current running through the coil M3 is decreased, whereby further after the lapse of a certain determined time after the shutter release the switch SW1 is closed so that only the voltage VZ1 is applied to the base of the transistor Tr6 in such a manner that the current running through the coil M3 is further controlled down upon the level of i6 shown in FIG. 9(b). By controlling the level of the current running through the coil M3 in this way it becomes easy to control the driving speed of the shutter blades.

FIG. 9(a) shows the wave form of the shutter release signal, FIG. 9(b) the wave form of the current in the coil M3 and FIG. 9(c) shows the wave form of the switch 1.

When the voltage between the base and the emitter of the transistor Tr6 is let to be VBE, the current i5 running through the coil M3 when the switch SW1 is opened is represented, $$i5 = \frac{VZ1 + VZ2 - VBE}{R2}$$

while that when the switch SW1 is closed is represented, $$i6 = \frac{VZ1 - VBE}{R2}$$

Thus, the wave forms are as is shown in FIG. 9(a). By changing the rising up wave form in this way the starting speed of the shutter blades can be increased.

As explained above, in case of the driving circuit in accordance with the present invention for the electromagnetically driven shutter, the starting speed of the shutter can be increased by adding a remarkably simple circuit, which is quite effective especially for such a device as electromagnetically driven shutter to which the current is supplied from a small capacity power source built in the camera.

What is claimed is:

1. An electromagnetically driven shutter for a camera, comprising:
   (a) a permanent magnet member composed of a ferromagnetic substance having a large coercive force;
   (b) a conductive member arranged to be under the influence of the magnetic field formed with the permanent magnet member, one of the conductive member and the permanent magnetic member being secured on the camera body and the other being movable;
   (c) a shutter blade arrangement including a plurality of light shading thin plates for blocking the photographing light path of a camera, and including a part connected to the plates and operatively connected to the movable one of the permanent magnetic member and the conductive member;
   (d) source means coupleable to a power source to supply current to the conductive member;
   (e) first switching means in series with said source means for forming a current supply circuit from the power source to the conductive member and to close the current supply circuit in response to a shutter release signal;
   (f) a capacitor; and
   (g) circuit means for connecting said capacitor to said source means along a path outside said conductive member so as to charge said capacitor prior to a release signal, and for connecting said capacitor to add the voltage of the capacitor to the voltage at the source means and apply it through the conductive member in response to a release signal so as to increase the initial speed of the shutter blade arrangement.

2. An electromagnetically driven shutter for camera in accordance with claim 1, wherein the conductor means is of coil shape.

3. An electromagnetically driven shutter for a camera in accordance with claim 1, further comprising:
   a current control means for controlling the level of the current running through the conductive means after the lapse of a predetermined time after the shutter release signal is applied to be lower than that of the current running through the conductive member during the predetermined time.

4. An electromagnetically driven shutter for a camera, in accordance with claim 3, wherein the operation of the current control means is controlled by means of the output of the delay circuit means in operative engagement with the shutter release signal.

5. An electromagnetically driven shutter for a camera in accordance with claim 3, wherein the operation of the current control means is controlled by means of switch means to be changed over after the lapse of the predetermined time in operative engagement with the operation of the shutter blades.

6. An electromagnetically driven shutter as in claim 1, wherein said circuit means includes second switching means in the path of the capacitor for forming a charging circuit for the capacitor and for closing the charging circuit until the shutter release and opening the shutter circuit during shutter release.

7. A shutter as in claim 1, wherein said circuit means includes a diode between said capacitor and said connector means, charging switch means connecting said capacitor across said diode and energized by a release signal so as to allow said capacitor to charge through the diode prior to a release signal and for placing said capacitor in series with the connector means in response to a release signal.

8. A shutter as in claim 7, wherein said circuit means further includes second switching means responsive to the absence of a release signal for forming a charging circuit for said capacitor during the absence of a release signal.

* * * * *